Oct. 24, 1939.  M. B. ARISMAN  2,177,126
CONTROL UNIT CONSTRUCTION
Filed Nov. 11, 1937
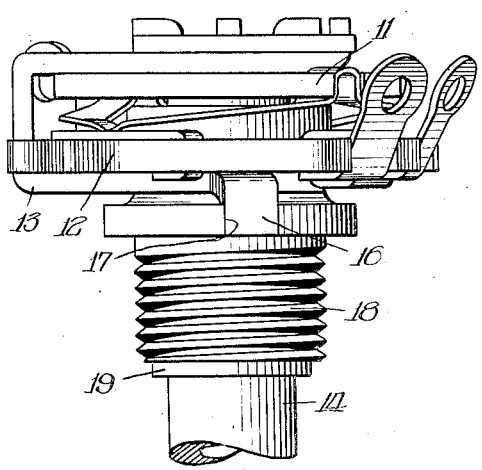
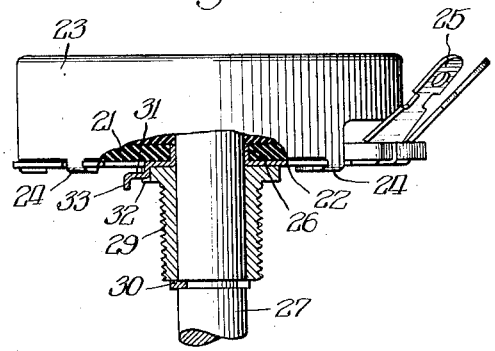
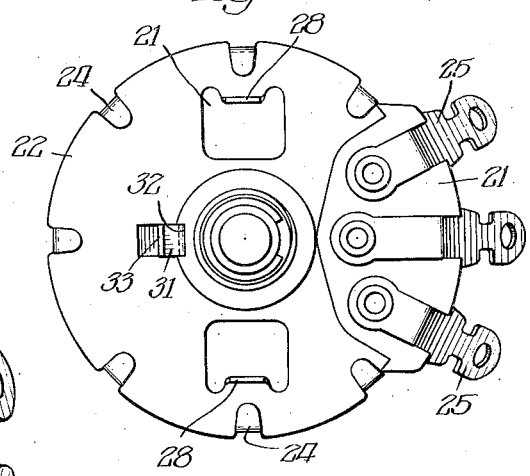
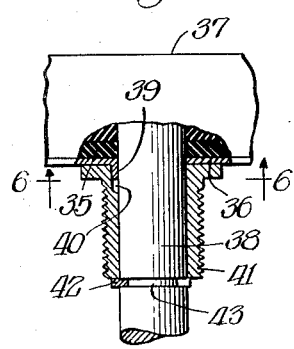
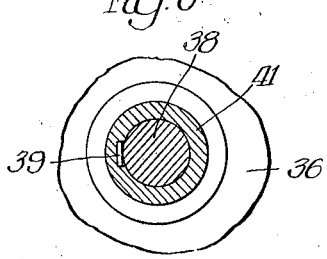
Inventor:
Mervin B Arisman,
By Wilkinson, Huxley, Byron & Knight
attys Patented Oct. 24, 1939

2,177,126

UNITED STATES PATENT OFFICE 2,177,126

CONTROL UNIT CONSTRUCTION

Mervin B. Arisman, Elkhart, Ind., assignor to Chicago Telephone Supply Company, Elkhart, Ind., a corporation of Indiana Application November 11, 1937, Serial No. 174,073

5 Claims. (Cl. 200—168)

This invention relates to a new and improved control unit construction and more particularly to a bushing, base and shaft assembly for control units.

Large numbers of various types of control units are used in modern radio sets, test instruments and the like. These units comprise different types of variable resistances with or without switches, and switches of various types for circuits, tone controls, wave change, and the like. These various controls have in common the fact that they include a base, a movable control shaft extending through the base and means for securing the unit in place upon a chassis or panel or other supporting means.

One common mounting means comprises a threaded bushing secured to the unit base and serving as a bearing for the shaft. The bushing extends through an opening in the supporting means for the unit and is held in place by a nut. The bushings extend through the base and have portions upset against the inner face of the base to hold them permanently in place. The bushing cannot ordinarily be removed without destroying the base or deforming the bushing or both. In other cases where bushings of this type are not used, the unit bases may be secured to their supporting structure by means of mounting ears or the like. The different types are not interchangeable as to parts, since the base designed to receive a bushing has too large an opening to serve as a bearing for the shaft if a bushing were not used.

It is an object of the present invention to provide a new and improved unit, bushing and shaft assembly.

It is a further object to provide an assembly in which the mounting bushing is detachably associated with the other parts.

It is also an object to provide an assembly of this character in which the unit provides a bearing for the shaft independently of the bushing.

It is an additional object to provide a construction in which a mounting bushing may be mounted on a unit without substantial alteration in the structure of the unit and without requiring an increase in size of the unit or a reduction in clearances between the bushing and current carrying parts of the device.

It is another object to provide a construction in which a unit of the type made without a bushing may be quickly supplied with a bushing to make it interchangeable with bushing types of units for assembly purposes.

It is a further object to provide an assembly composed of but few parts and adapted for commercial production and use.

Other and further objects will appear as the description proceeds.

I have shown certain preferred embodiments of my invention in the accompanying drawing, in which—

Figure 1 is an elevation of one form of my invention applied to a rotary switch;

Figure 2 is a view of the device of Figure 1 as seen from below;

Figure 3 is an elevation, partly broken away, showing another form of the invention applied to a variable resistance unit;

Figure 4 is a view of the device of Figure 3 as seen from below;

Figure 5 is a fragmentary view, partly in section showing a further form of my device; and Figure 6 is a section taken on line 6—6 of Figure 5.

Referring first to the form of construction shown in Figures 1 and 2, a rotary switch member 11 is held adjacent a base 12 by the U-shaped frame member 13. The details of the switch construction form no part of the present invention and need not be described. The switch is actuated by rotation of the shaft 14 which is secured to switch parts and has spaced bearings in the U-shaped member 13. The switch parts to which the shaft is secured being confined between the arms of the U-shaped frame 13, it follows that the shaft 14 is restrained against axial movement in either direction with respect to the base 12 and the entire switch unit beyond the few thousandths of an inch permitted by the contact spring in the switch. The frame member 13 is provided with a lug 15, as seen in Figure 2, which may engage a notch or opening in the member upon which the switch is mounted, in order to prevent rotation of the frame and base.

The U-shaped frame 13 is also provided with a second upturned lug 16 which fits in a notch or recess 17 in the threaded bushing 18. The bushing 18 fits around the shaft 14 and is held against axial displacement by the C washer 19 which fits in a groove in the shaft. This device may be supplied and used with or without the bushing 18. It may be mounted and held in place by other means when the bushing is not supplied. A bushing may be added at any time by merely slipping it upon the shaft and bending a C washer into place in the groove in the shaft. Similarly if supplied with a bushing and the bushing is not desired for use, it may be removed by bending the C washer to release the bushing from the shaft. The bushing is not injured in any way and may be salvaged for other use.

In Figures 3 and 4 another form of my invention has been shown by way of example as applied to a variable resistance. This unit comprises a base 21 to which is fitted the mounting plate 22. The movable contact and associated parts form no part of the present invention and have not been shown in detail. They are enclosed in the housing 23 which is secured to the base 21 and plate 22 by the ears 24. The terminals 25 for the resistance are secured to the base 21.

As shown in Figure 3, the plate 22 has an upturned inner edge 26 which serves as a bearing for the shaft 27. The shaft 27 is rotatable in this bearing and serves to move the contact means for varying the resistance in circuit, but as in the embodiment of the invention shown in Figures 1 and 2 is substantially restrained against axial motion in either direction with respect to the mounting plate 22. As shown in Figure 4 the plate 22 is provided with the upturned lugs 28. These lugs may serve, when no bushing is used, to secure the unit to a chassis or panel. When a threaded bushing is used the lugs 28 may engage recesses or holes in the member upon which the unit is mounted for the purpose of preventing rotation of the body of the unit.

The threaded bushing 29 is held upon the shaft 27 by the C washer 30. The bent up lug 31 fits in a notch 32 in the bushing 29. As shown in the drawing, this lug 31 has an extended end 33 which may also assist in locating the unit relative to the support upon which it is mounted.

In Figures 5 and 6 is shown a modified form of construction in which the unit is shown with a base 35, base plate 36 and housing 37. The shaft 38 passes into the unit through the base and base plate and is substantially restrained against axial motion with respect thereto. The base plate 36 is formed with an outturned lug 39 fitting against the shaft 38. This lug 39 fits in an inner recess 40 formed in the threaded bushing 41. The bushing is held against the base plate by the C washer 42 fitting in the groove 43 in the shaft 38.

It will be apparent that the forms of construction shown in Figures 3 to 6 may be used with or without the threaded bushing in the same manner as has been described in connection with Figures 1 and 2. The bushing may be added or removed at any time without damage to the unit or the bushing. The only loss in removing the bushing is of the C washer which may be deformed so it cannot be reused, but the cost of these washers is negligible.

I have shown certain preferred forms of construction by way of example. From these it will be apparent that the bushing locating lug may be inside or outside the bushing. Also, this locating lug may serve the additional function of locating the unit on its support or other means may be provided for that purpose. The invention may be embodied in other forms and I contemplate such further changes and modifications as come within the spirit and scope of the appended claims.

I claim:

1. In combination, a control unit having a base and a movable shaft extending through the base, a metal bearing for the shaft fixedly carried by the base, a separate bushing loosely fitted on the shaft and receiving support from the outer face of the base, coacting means on the base and bushing to limit rotary movement of the bushing relative to the base, said shaft having a groove therein, and a C washer fitted in said groove and engaging the free end of the bushing to hold the bushing in place.

2. In combination, a control unit having a base, a metal plate on the base, a rotatable actuating shaft for said unit, the shaft extending through the base, a separate threaded bushing loosely fitted on said shaft and engaging the outer face of the metal plate, a turned up lug on the metal plate engaging the bushing to limit its rotation relative to the base, and means carried by the shaft for holding the bushing in place.

3. In combination, a control unit having a base, a metal plate fixedly secured to the base, a rotatable actuating shaft for said unit, the shaft extending through the base, a separate threaded bushing loosely fitted on said shaft and engaging the outer face of the metal plate, a turned up lug on the metal plate engaging the bushing to limit its rotation relative to the base, said lug having an extended portion adapted to engage a support to limit movement of the unit relative to the support, and means carried by the shaft for holding the bushing in place.

4. In combination, a control unit having a base and a rotatable operating shaft projecting from one face of the base, said shaft being substantially axially immovable with respect to the base, a separate bushing loosely fitted on the projecting end portion of the shaft, said bushing being restrained against inward axial movement along the shaft by the base but being unrestrained by the base against direct outward axial movement so that the bushing is directly and freely removable from the shaft without disturbing the operativeness of the unit, cooperating means on the base and the bushing for holding the bushing against turning with respect to the base when the bushing is in place on the shaft, and removable means on the shaft and engaging the bushing for securing the same against outward axial movement, whereby the bushing is removably held in place.

5. In combination, a control unit having a base and a rotatable operating shaft projecting from one face of the base, said shaft being substantially axially immovable with respect to the base, a separate bushing loosely fitted on the projecting end portion of the shaft, said bushing receiving support from the base against inward axial movement and being wholly exterior to the base so as not to be restrained by the base against outward axial movement along the shaft so that the bushing is directly and freely removable from the shaft without disturbing the operativeness of the unit, a coacting lug and groove on the base and the bushing for holding the bushing against turning with respect to the base when the bushing is in place on the shaft, and removable means on the shaft and engaging the bushing for securing the same against outward axial movement, whereby the bushing is removably held in place.

MERVIN B. ARISMAN.